United States Patent
Tatarkiewicz

(10) Patent No.: US 12,360,742 B2
(45) Date of Patent: *Jul. 15, 2025

(54) METHOD AND APPARATUS FOR TRUE RANDOM NUMBER GENERATOR BASED ON NUCLEAR RADIATION

(71) Applicant: RANDAEMON sp. z o.o, Warsaw (PL)

(72) Inventor: Jan Jakub Tatarkiewicz, San Diego, CA (US)

(73) Assignee: RANDAEMON sp. z o.o, Warsaw (PL)

( * ) Notice: Subject to any disclaimer, the term of this patent is extended or adjusted under 35 U.S.C. 154(b) by 624 days.

This patent is subject to a terminal disclaimer.

(21) Appl. No.: 17/687,631

(22) Filed: Mar. 5, 2022

(65) Prior Publication Data

US 2023/0032337 A1 Feb. 2, 2023

Related U.S. Application Data

(63) Continuation-in-part of application No. 17/687,630, filed on Mar. 5, 2022, now Pat. No. 11,586,421, and a continuation of application No. 17/409,971, filed on Aug. 24, 2021, now Pat. No. 11,249,725.

(60) Provisional application No. 63/279,587, filed on Nov. 15, 2021, provisional application No. 63/277,759, filed on Nov. 10, 2021, provisional application No. 63/270,912, filed on Oct. 22, 2021, provisional application No. 63/234,820, filed on Aug. 19, 2021, provisional application No. 63/235,031, filed on Aug. 19, 2021, provisional application No. 63/224,811, filed on Jul. 22, 2021.

(51) Int. Cl.
*G06F 7/58* (2006.01)
*G21H 5/00* (2006.01)

(52) U.S. Cl.
CPC .............. *G06F 7/588* (2013.01); *G21H 5/00* (2013.01)

(58) Field of Classification Search
CPC ............................. G06F 7/58–588; G21H 5/00
USPC ........................................................ 708/255
See application file for complete search history.

(56) References Cited

U.S. PATENT DOCUMENTS

| | | | |
|---|---|---|---|
| 3,445,591 A | 5/1969 | Koehler |
| 3,546,356 A | 12/1970 | Graybill |
| 3,790,768 A | 2/1974 | Chevalier |
| 4,527,798 A | 7/1985 | Siekierski |

(Continued)

FOREIGN PATENT DOCUMENTS

WO 2014080272 A1 5/2014

OTHER PUBLICATIONS

International Search Report and Written Opinion for PCT/US2019/017748 mailed Dec. 30, 2019 (6 pages).
B. Škorić 2015 Lecture notes 2IMS10 Technical University Eindhoven (Holland) Physical aspects of digital security.
D.F. Williams et al. 1993 Oak Ridge National Laboratory TM-12399 Recovery and Purification of Nickel-63 from HFIR-irradiated Targets.

(Continued)

*Primary Examiner* — Matthew D Sandifer
(74) *Attorney, Agent, or Firm* — Manuel de la Cerra

(57) ABSTRACT

A true random number generator (TRNG) is disclosed that includes an enclosure. The enclosure enfolds a radioactive source, defining a radioactive source surface and a cavity separating the radioactive source from an array of cells, which defines an array surface with an edge. Each cell in the array comprises a detector constructed to detect electrons within the cavity from the decay of the radioactive source and to produce a signal for the detected energy. A projection of the radioactive source surface onto the array surface extends beyond the edge and encompasses the array surface.

13 Claims, 10 Drawing Sheets

(56) References Cited

U.S. PATENT DOCUMENTS

| | | |
|---|---|---|
| 4,855,690 A | 8/1989 | Dias |
| 4,905,176 A | 2/1990 | Schulz |
| 5,570,307 A | 10/1996 | Takahshi |
| 5,627,894 A | 5/1997 | Albert |
| 5,732,138 A | 3/1998 | Noll |
| 5,987,483 A | 11/1999 | Edelkind |
| 6,249,009 B1 | 6/2001 | Kim |
| 8,001,054 B1 | 8/2001 | Peart |
| 6,346,700 B1 | 2/2002 | Cunningham |
| 6,415,309 B1 | 7/2002 | Shilton |
| 6,430,170 B1 | 8/2002 | Saints |
| 6,539,410 B1 | 3/2003 | Klass |
| 6,542,014 B1 | 4/2003 | Saito |
| 6,687,721 B1 | 2/2004 | Wells |
| 6,697,829 B1 | 2/2004 | Shilton |
| 6,745,217 B2 | 6/2004 | Figotkin |
| 7,031,991 B2 | 4/2006 | Hars |
| 7,124,157 B2 | 10/2006 | Ikake |
| 7,476,370 B2 | 1/2009 | Mitsugashira |
| 8,001,168 B2 | 8/2011 | Tsuyuzaki |
| 8,037,117 B2 | 10/2011 | Saito |
| 9,335,972 B2 | 5/2016 | Yang |
| 10,430,161 B1 | 10/2019 | Tatarkiewicz |
| 2004/0035201 A1 | 2/2004 | Vincze |
| 2009/0165086 A1 | 6/2009 | Trichina |
| 2012/0030268 A1 | 2/2012 | Liu |
| 2015/0064047 A1 | 3/2015 | Elwha |
| 2018/0217817 A1 | 8/2018 | Gorfinkle |
| 2019/0258458 A1 | 8/2019 | Walmsley |
| 2019/0310830 A1 | 10/2019 | Tatarkiewicz |
| 2019/0347076 A1 | 11/2019 | Park |
| 2020/0026888 A1* | 1/2020 | Mobley ............ G09C 1/00 |
| 2020/0065068 A1 | 2/2020 | Hekmatshoartabari |
| 2020/0092328 A1 | 3/2020 | Kim |
| 2020/0210147 A1 | 7/2020 | Lee |
| 2022/0035959 A1* | 2/2022 | Mobley ............ G06F 21/86 |

OTHER PUBLICATIONS

J. von Neumann 1951 Res. Nat. Bur. Stand. Appl. Math. Series 3, 36-38 Various techniques used in connection with random digits.

M.J. Berger and S.M. Seltzer 1982 National Bureau of Standards NBSIR 82-2550 Stopping Powers and Ranges of Electrons and Positrons.

M.-M. Bé et al. 2008 Bureau International des Poids et Mesures, Sevres (France) BIPM-5 vol. 1-4 Table of Radionuclides.

NRC Personal Annual Radiation Dose Calculator https://www.nrc.gov/aboutnrc/radiation/around-us/calculator.html.

Patuleanu et al. 2017 Proc. Romanian Acad. series A, vol. 18, 389-402 True random number sequences from gamma-decay using four extraction methods.

Jones on "True random number generators for a more secure IoT", Mar. 2016. Retrieved on [Oct. 29, 2020]. Retrieved from the Internet <https:l/www.techdesignforums.com/practice/technique/true-random-number-generators-for-more-secure-systems/> (Year: 2016).

S. Burri, D. Stucki, Y. Maruyama, C. Bruschini, E. Charbon and F. Regazzoni, "SPADs for quantum random number generators and U beyond," 2014 19th Asia and South Pacific Design Automation Conference (AS P-DAC), Singapore, 2014, pp. 788-794, doi: 10.11 09/ASPDAC.2014.6742986. (Year: 2014).

Duggirala R., Lal A., Radhakrishnan S. (2010) Radioisotope Decay Rate Based Counting Clock. In: Radioisotope Thin-Film Powered Microsystems. MEMS Reference Shelf, vol 6. Springer, New York, NY. https://doi.org/10.1007/978-1-4419-6763-3_7 ( Year: 2010).

Collantes et al. "Quantum Random Number Generators", 2016 Retrieved from the Internet <https://arxiv.org/pdf/1604.03304.pdf> (Year: 2016).

Rohe, "RANDy—A True-Random Generator Based on Radioactive Decay", 2003. Retrieved from the Internet <https://citeseerx.ist.psu.edu/viewdoc/download?doi=1 0.1.1.11 0.9725&rep=rep1 &type=pdf> (Year: 2003).

International Search Report in PCT/US2020/065962 dated Apr. 22, 2020 (6 pages).

* cited by examiner

METHOD AND APPARATUS FOR TRUE RANDOM NUMBER GENERATOR BASED ON NUCLEAR RADIATION

1.0 PRIORITY APPLICATIONS AND REFERENCES

This application claims priority as a continuation of U.S. application Ser. No. 17/513,661 titled "Method And Apparatus For Highly Effective Beta Decay Based On-Chip True Random Number Generator" filed on Oct. 28, 2021; as a continuation-in-part to U.S. application Ser. No. 17/687,630 titled "Method for Making Cost-Effective Nickel-63 Radiation Source for True Random Number Generators" filed on Mar. 5, 2022; U.S. Provisional Application Ser. 63/279,587 titled "Method for Cost-Effective Nickel-63 Radiation Source for True Random Number Generators" filed on Nov. 15, 2021; to U.S. Provisional Application Ser. 63/277,759 titled "Method for Cost-Effective Nickel-63 Radiation Source for True Random Number Generators" filed on Nov. 10, 2021, to U.S. Provisional Application Ser. 63/224,811 titled "Method And Apparatus For Highly Effective Beta Decay Based On-Chip True Random Number Generator" filed on Jul. 22, 2021; to U.S. Provisional Application Ser. 63/234,820 titled "Method And Apparatus For Highly Effective Beta Decay Based On-Chip True Random Number Generator" filed on Aug. 19, 2021; to U.S. Provisional Application Ser. 63/235,031 titled "Method And Apparatus For Highly Effective Beta Decay Based On-Chip True Random Number Generator" filed on Aug. 19, 2021; and to U.S. Provisional Application Ser. 63/270,912 titled "Method And Apparatus For True Random Number Generator Based On Nuclear Radiation" filed on Oct. 22, 2021, all of which are incorporated herein by reference in their entireties.

This application is also related to U.S. application Ser. No. 17/409,971 filed on Aug. 24, 2021 titled "Method And Apparatus For Highly Effective On-Chip True Random Number Generator Utilizing Beta Decay"; U.S. Provisional Application Ser. 62/984,528 filed on Mar. 3, 2020 titled "Method And Apparatus For Tritium-Based True Random Number Generator"; to U.S. Provisional Application Ser. 63/062,672 filed on Aug. 7, 2020 titled "Method And Apparatus For Beta Decay Based True Random Generator"; to U.S. Provisional Application Ser. 62/655,172 filed on Apr. 9, 2018 titled "Apparatus, Systems, And Methods Comprising Tritium Random Number Generator"; to U.S. Provisional Application Ser. 62/803,476 filed on Feb. 9, 2019 titled "Apparatus, Systems, And Methods Comprising Tritium Random Number Generator" now U.S. Pat. No. 10,430,161; to U.S. application Ser. No. 16/273,365 filed on Feb. 12, 2019 titled "Apparatus, Systems, And Methods Comprising Tritium Random Number Generator"; to U.S. application Ser. No. 16/990,087 filed on Aug. 11, 2020 titled "Apparatus, Systems, And Methods For Beta Decay Based True Random Number Generator" now U.S. Pat. No. 10,901,695; U.S. application Ser. No. 17/126,265 filed on Dec. 18, 2020 title "Method and Apparatus for Tritium-based True Random Number Generator" now U.S. Pat. No. 11,048,478; to U.S. application Ser. No. 17/062,307 filed on Oct. 2, 2020 titled "Apparatus, Systems, And Methods For Beta Decay Based True Random Number Generator" now U.S. Pat. No. 11,036,473; PCT Application SN PCT/US19/17748 titled "Apparatus, Systems, And Methods Comprising Tritium Random Number Generator" filed on Feb. 13, 2019; PCT Application SN PCT/US20/65962 titled "Apparatus, Systems, And Methods For Beta Decay Based True Random Number Generator" filed on Dec. 18, 2020; and PCT Application SNPCT/US20/65976 titled "Apparatus, Systems, And Methods For Beta Decay Based True Random Number Generator" filed on Dec. 18, 2020. Each of the patent applications, issued patents, and other references discussed and/or cited herein, are incorporated by reference as if fully set forth herein.

Referenced herein and also incorporated are the following: (1) M.-M. Bé et al. 2008 Bureau International des Poids et Mesures, Sevres (France) BIPM-5 vol. 1-7 *Table of Radionuclides*; (2) Belghachi A. et al. 2020 Acta Physica Polonica A vol. 137, no. 3, pp. 324-331, *A model of Ni-63 source for betavoltaic application*; and (3) Knechtel J. et al. 2017 PSJ Transactions on System LSI Design Methodology vol. 10 pp. 45-62 *Large-Scale 3D Chips: Challenges and Solutions for Design Automation, Testing, and Trustworthy Integration*.

2.0 TECHNICAL FIELD

The present disclosure relates generally to true random number generators, specifically random number generator technologies utilizing the spontaneous nickel isotope decay, as well as apparatus, systems, and methods regarding same.

3.0 BACKGROUND

As opposed to pseudo-random number generators based on numerical algorithms, there are true random number generator (TRNG) devices that depend on natural random processes: multiple bipolar switches, thermal noise, light scattering by dichroic mirrors, chaotic systems, decay of radioactive nuclei. Some of these TRNGs are listed in the provisional applications to which the present application claims priority, and those references are incorporated herein by reference as if fully set forth herein.

The decay of radioactive nuclei type is considered to be the most independent on environmental influences like temperature, pressure, or acceleration. However, typical nuclear-based TRNGs require large size detectors to enable the registration of particles emitted as a result of radioactive decays. Also, many nuclei used in such devices are highly radioactive and poisonous hence dangerous to humans if a device is broken.

Therefore, a safe and small TRNG that will not expose the user to dangerous levels of radiation would be advantageous. Such a TRNG can then be used in compact personal devices.

4.0 SUMMARY

A true random number generator (TRNG) is disclosed that includes an enclosure. The enclosure enfolds radioactive source defining a radioactive source surface and a cavity separating the radioactive source from an array of cells that define an array surface with an edge. Each cell in the array comprises a detector constructed to detect electrons within the cavity from the decay of the radioactive source and to produce a signal for the detected energy. A projection of the radioactive source surface onto the array surface extends beyond the edge and encompasses the array surface.

The radioactive source may be nickel. The TRNG array surface may have a center point, and the size of the detector in each cell is based on the distance of the detector from the center point.

The TRNG may also include a memory connected to each detector in the array of cells, wherein the memory stores the produced signals from the detector. A TRNG processor may produce a true random number based on the contents of the memory.

Additional aspects, alternatives, and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

5.0 BRIEF DESCRIPTION OF DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

6.0 DETAILED DESCRIPTION OF EXAMPLE EMBODIMENTS

Figure 1:
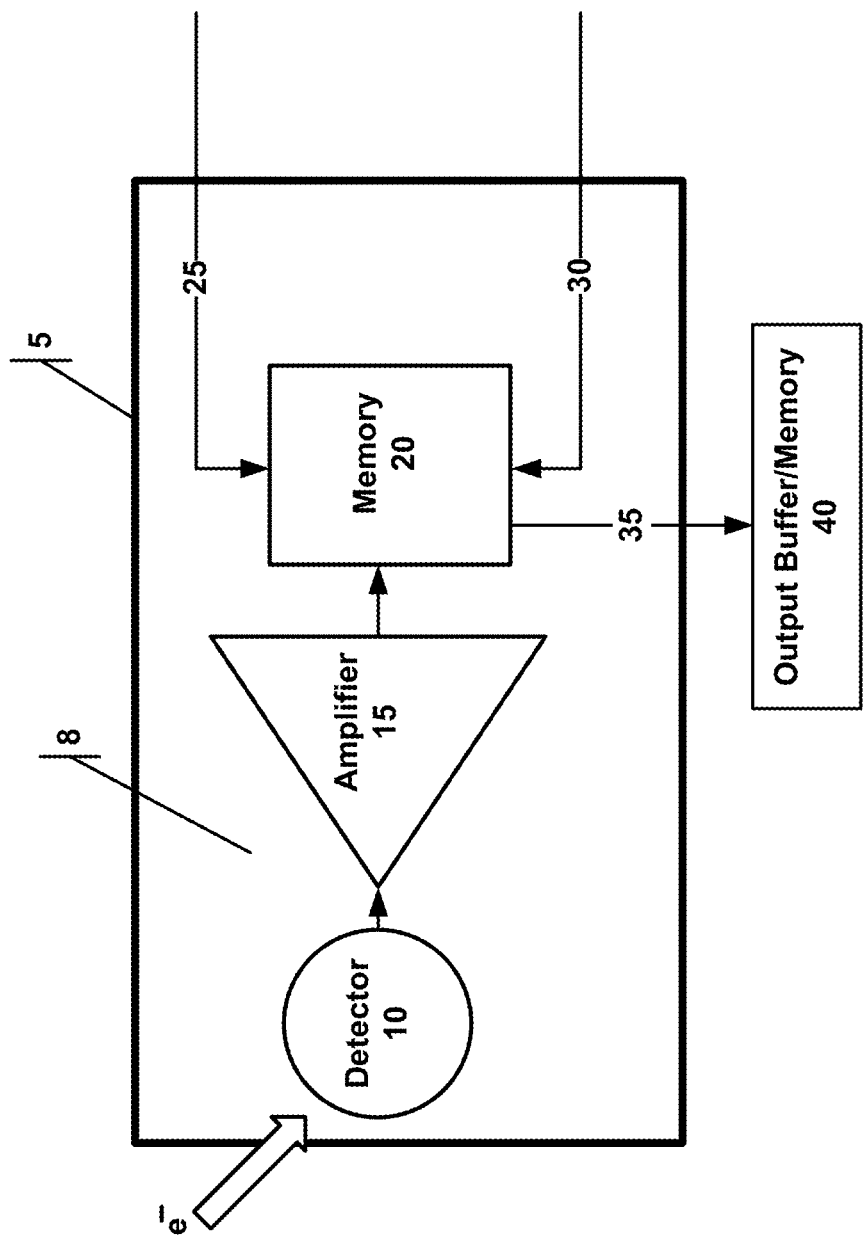
FIG. 1 illustrates a circuit for registering electron hits of the detector.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship, or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds to the attached figures and is provided for ease of reference, where like reference numerals designate corresponding features throughout the specification and figures:

Cell 5
Silicon Substrate 8
Detector 10
Amplifier 15
Memory 20
Word Line 25
Reset Line 30
Bit Line 35
Output Buffer/Memory 40
TRNG Detector Chip with Cell Array Matrix 45
Cell Array Matrix Surface 46
Chip Cover/Enclosure 50
Radioactive Source 55
Radioactive Source Surface Projection (without extension) 56
Radioactive Source Extension 57
Radioactive Source Surface (with extension) 58
Radioactive Source Surface Projection (with extension) 59
Cavity 60
Through Silicon Vias/Connections 65
Processing Circuitry 70
Control Block 75
TRNG Processor 80

This is related to our previous published US patents and applications listed above, in which we described the general idea of using pure beta minus (electron emission) nuclear decay as a medium or source of entropy for generating true random numbers by detecting emitted electrons on-chip through an electronic sensor or array of sensors. In this application, we would like to present the approach that allows for a much faster or more efficient (larger number of bits per time unit) generation of random numbers on-chip from the very same source of entropy i.e., $^{63}$Ni.

Searching the BIPM *Table of Radionuclides* (2008) we find three abundant nuclides that produce pure beta-minus decay (only emission of an electron and to conserve momentum some practically undetectable neutrino) in the range of energies below 512 keV (which is the energy of electrons that produces highly penetrable gamma rays creating potential radiation hazard) and having reasonable half-life times of more than ten years. There are some other exotic nuclides listed in the abovementioned tables and fulfilling our requirements, but they are mostly products of decays of other exotic nuclides hence not practical for industrial applications. The three nuclides, easy to obtain and to process, are:
 a. 1. $^3$H tritium with maximum energy of emitted electrons being 18 keV (mean energy about 5.7 keV) and half-life time of about 12.4 years,
 b. 2. $^{63}$Ni nickel with maximum energy of emitted electrons being about 67 keV (mean energy about 17 keV) and half-life time of about 98.7 years,
 c. 3. $^{14}$C carbon with maximum energy of emitted electrons being about 156 keV (mean energy about 45 keV) and half-life time of about 5,700 years.

When dealing with these low-energy radiative nuclei (except in the case of gaseous tritium that is very difficult to handle due to its high permeation through solids and thus is better processed in the form of gel or solid compound as discussed in our U.S. Pat. No. 11,048,478), one has to note that because of the limited range of emitted electrons in solids (self-absorption of electrons), only a very thin layer of radioactive material is externally active i.e., electrons emitted from the material are created only in a very thin layer. For example, $^{63}$Ni has maximum surface radioactivity of about 20 mCi/cm$^2$ independently of increasing thickness of the material, cf. Belghachi et al. (2020)—only about 15 microns of such a material is relevant for external radioactivity. We note that because 1 Ci equals about 3.7·10$^{10}$ decays/sec, the limit of 20 mCi/cm$^2$ corresponds to about 7.4·10$^8$ decays/(cm$^2$·sec) or slightly less than 10$^9$ decays/(cm$^2$·sec). This suggests that a potential on-chip random number generator based on $^{63}$Ni can produce up to 1 billion bits per second from 1 cm$^2$ of the detector area, with more area taken by other electronics. The low energy of tritium beta decay makes the thickness of the active layer much thinner than for other pure beta decay radionuclides considered here and thus gives a smaller maximum number of bits generated per area. On the other hand, the half-life time of a given nuclide limits the total number of electrons emitted per time unit. For example, with 10 billion or 10$^{10}$ atoms of $^{63}$Ni, only half will decay during 98.7 years or about 2 per second. For $^{14}$C radionuclide with a very long half-life time, this severely limits the total possible radioactivity per time unit: one needs about a trillion or 10$^{12}$ atoms of $^{14}$C to get 2 decays per second or 100× more carbon 14 nuclei are needed for the same radioactivity as for nickel-63. In other words, about 12× larger area of radioactive material will be required to get the same effective number of decays per second because the range of 45 keV electrons (average energy) in carbon is only about 8× larger than of 17 keV electrons (average energy) in nickel, cf. Berger and Seltzer (1982) (the effective layer can be 8× thicker). Hence $^{63}$Ni seems to be the sweet spot of efficiency per surface of radioactive material as a source of entropy for on-chip random number generators. However, its maximum radioactivity still limits the number of bits that can be generated on the chip because one cannot use too big detectors due to the so-called detector reaction dead time. The shortest time between pulses that can be detected depends on the low capacitance of the detector—this capacitance increases proportionally to the area of a detector. In our U.S. Pat. No. 11,036,473, we suggested using an array of small detectors that can be applied to overcome the abovementioned limitation. Here we describe problems associated with such an approach and methods to solve these problems.

The main problem of all random number generators based on natural phenomena like the emission of photons or electrons (known pure quantum processes) is the stability of the entropy source. In the case of photon-based devices, the source of photons is highly dependent on temperature, supplied voltage, and long-term stability of light emitter (diode or laser) among other factors. For beta decays, resulting from weak interactions inside the nuclei, there is no influence of external fields (like gravitational or electromagnetic) on the timing or direction of decays. Only at very low temperatures close to absolute zero and in very high magnetic fields these decays do show anisotropy or the so-called parity violation, cf. Nobel Prize 1957. The only effect on the stability of the radionuclide entropy source at normal conditions is its own half-life time that diminishes the number of decays in time. As mentioned above, for $^{63}$Ni the half-life time is about 98.7 years. According to an exponential equation that governs the number of decays in time N= $N_0 \cdot e^{-\lambda t}$ (N is the number of atoms left from the initial number $N_0$ after time t with $\lambda$=ln(2)/$t_{1/2}$, where $t_{1/2}$ is half-life time), after 2 years there will be still 98.6% of nickel-63 radioactive atoms left or in other words, initially, nickel activity will only diminish by less than 0.7% per year. That can be easily corrected by the process of self-calibration mentioned in our U.S. Pat. No. 11,036,473 (changing of the read-out time).

Let us make simple estimates for the number of small detectors required to generate 1 billion or 10$^9$ bits per second with a $^{63}$Ni entropy source. Assuming an individual detector radius of 11 microns and entropy source with an activity of 15 mCi/cm$^2$ we get about 527 counts per second per detector area. 1,024 detectors read 1,000 times per second will give us as per our U.S. Pat. No. 11,036,473 the number of 1 million bits per second. However, diode detectors (such as PIN, SPAD, or APD diode) unlike pixels of CCD cameras cannot collect charge and hence require additional, simple memory circuits and readout lines to retain counts.

A simple cell 5 required to register any electron hits of the detector is presented in FIG. 1. The cell 5 is comprised of silicon substrate 8 with a detector 10, connected to an amplifier 15, and memory 20 to store a detection event. The amplifier 15 amplifies the pulse produced by the detector 10 when an electron hits the detector 10 and has a write buffer at the output. This buffer writes "1" to the memory 20 when an electron is detected. Subsequent detection events at the very same detector will not change the state of the memory cell. Thus, the memory cell may contain only zero or one—the equivalent of one random bit. The cell 5 may have a word line 25 that when signaled, causes the memory 20 to report its contents on the bit line 35. The reset line 30 clears the cell of its memory to ready the cell for another detection period. The individual cells can be arranged into an array as described in the patent applications cited above. The state of all the cells 5 in the array is read and stored in the output buffer/memory 40 via the bit lines 35 when this linear array 40 is selected with "1" on the word line 25. New contents in the output buffer/memory 40 replace the previous one.

Figure 2:
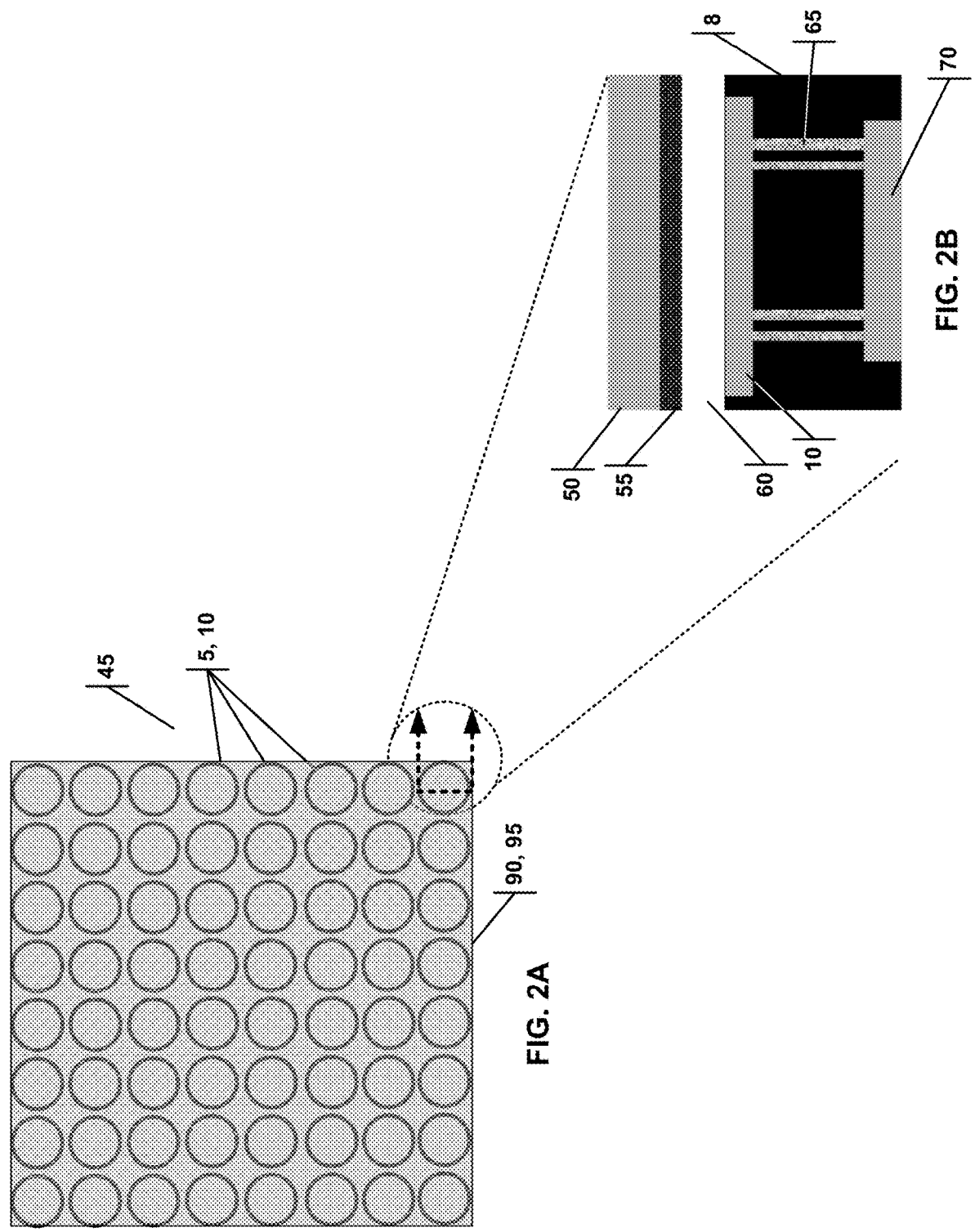
FIG. 2A is a top view of a detector chip with a cell array matrix with the cover and radioactive source made semi-transparent so that the array of detectors can be seen.
FIG. 2B is a cross-section view of a portion of a single detector chip within a cell array matrix with a cell array of FIG. 2A illustrating a circuit for registering electron hits of the detector using through silicon vias.

FIG. 2A illustrates a TRNG detector chip comprising cell array matrix 45 and a chip cover/enclosure 50 and a radioactive source 55 (both made semi-transparent so that the array of detectors 5 can be seen). FIG. 2B is a cross-section view of a portion of the detector chip with a single detector cell from the array matrix of FIG. 8A. This cross-sectional view illustrates the chip cover/enclosure 50 and the radioactive source 55 (the preferred source is radioactive nickel), separated by a cavity 60 from the detector 10. The processing circuitry 70 connects to detector 10 by through silicon vias connections (TSV) 65 in the silicon substrate 8, thus protecting the processing circuit 70 from the beta radiation i.e., the electrons emitted by the radioactive source. The thickness of the TSV may be selected to optimize the protection of the processing circuitry 70. TSV are described e.g., in Knechtel J. et al. 2017. The Si wafer will have a total thickness of much more than 10 microns so all electrons emitted by the radioactive source 95 will be absorbed in it.

An issue not previously addressed in the cited patent applications is that a true random number is optimally generated when the radiation source generates the same flux of electrons on each detector. In other words, all the detectors in the array should be exposed to a uniform flux of electrons. If some areas are hotter than others, those areas will report a detection more frequently which will result in the generation of a number that is not random.

To arrive at a uniform flux, the source material should be infinite. Otherwise, detectors in the middle of an array will receive much larger doses of electrons than those on the edge of an array. It is worth noting that nuclear radiation sources described in the abovementioned patent like $^{63}$Ni (beta decay) provide fluxes of electrons that are uniform in angular distribution (isotropic). This property allows for a calculation of the flux penetrating given detector in the array depending on its position. To do calculations, the following real-world dimensions are used and illustrated in FIG. 3:

distance between source and chip surfaces a=2,000 μm
linear spread of the array b=10,000 μm
diameter of a single detector d=11 μm The results are obtained using equations that define angles of irradiation for a given detector placement assuming that the flux is proportional to the irradiation angle:

$$I \sim \Delta\theta \quad (1)$$

Figure 4:
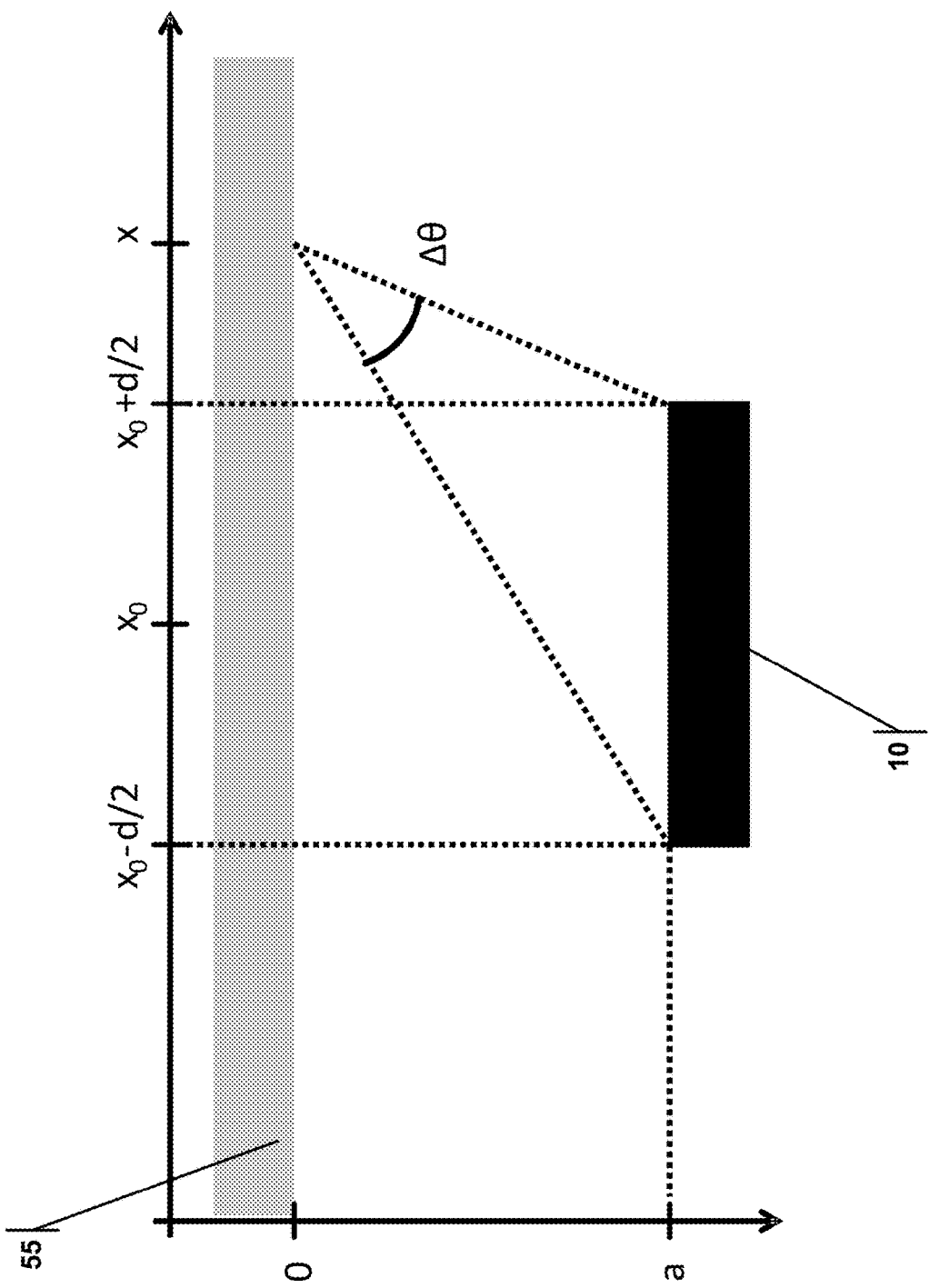
FIG. 4 illustrates the three regions from which a detector will detect electrons from the decay of the radioactive source.

As illustrated in FIG. 4, three regions are contributing to the total flux: on the left of the detector, just in front of the detector, and right of the detector. The middle of the detector is positioned at $x_0$. For these three regions the angles of irradiation from a point source located at x are described as functions of inverse tangents:

$$\Delta\theta(x) = \tan^{-1}\left(\frac{a}{x_0 - 0.5d - x}\right) - \tan^{-1}\left(\frac{a}{x_0 + 0.5d - x}\right); x \in [0, x_0 - 0.5d] \quad (2)$$

$$\Delta\theta(x) = \tan^{-1}\left(\frac{x}{a}\right) + \tan^{-1}\left(\frac{d-x}{a}\right); x \in [x_0 - 0.5d, x_0 + 0.5d] \quad (3)$$

$$\Delta\theta(x) = \tan^{-1}\left(\frac{a}{x - x_0 - 0.5d}\right) - \tan^{-1}\left(\frac{a}{x - x_0 + 0.5d}\right); \quad (4)$$

$$x \in [x_0 + 0.5d, 2c + b]$$

Figure 6:
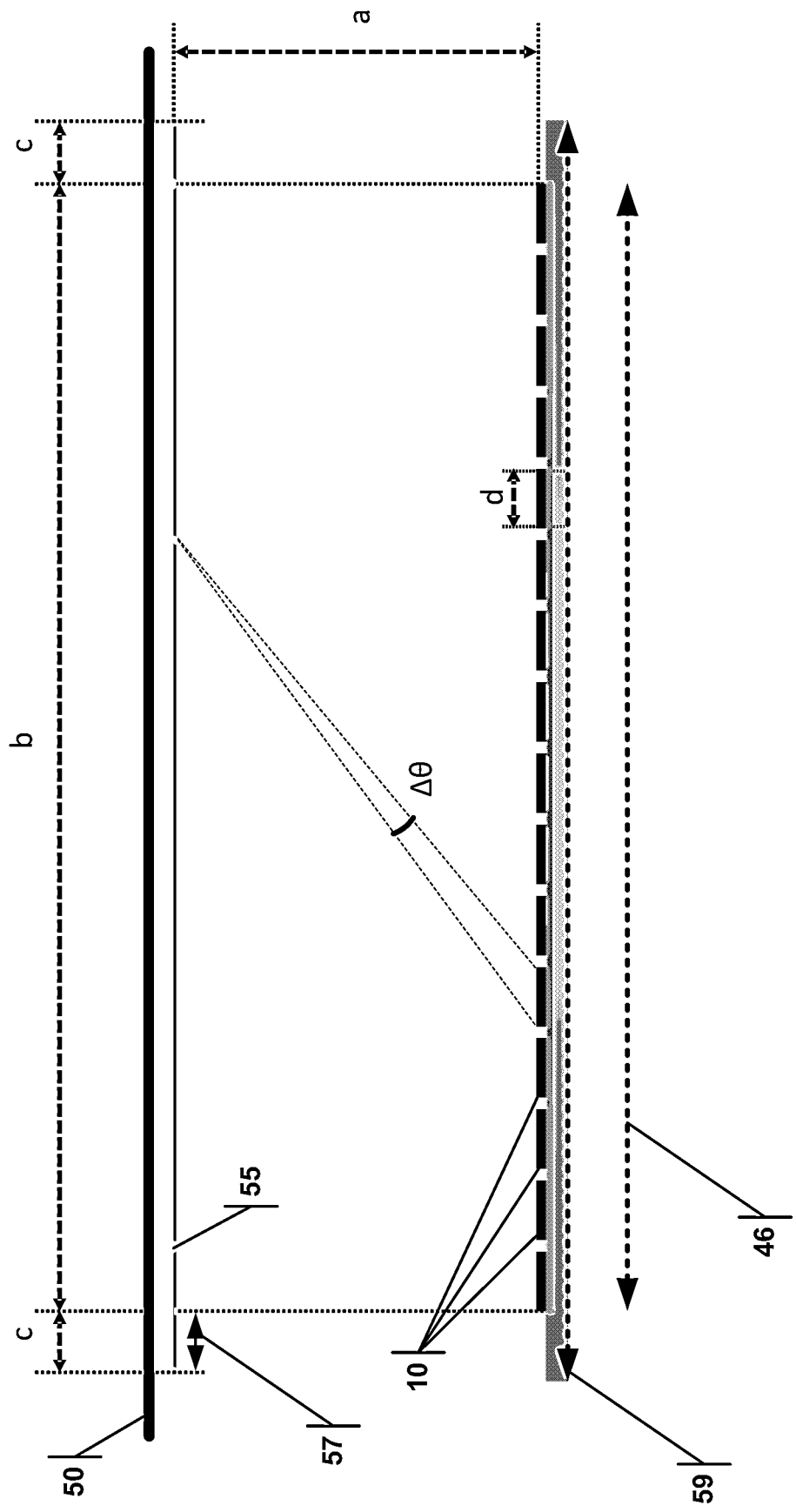
FIG. 6 illustrates a cross-section of a TRNG with a radioactive source and a matrix of detectors. Unlike FIG. 3, the source has a projected surface that is larger than the surface of the matrix of detectors.
Figure 7:
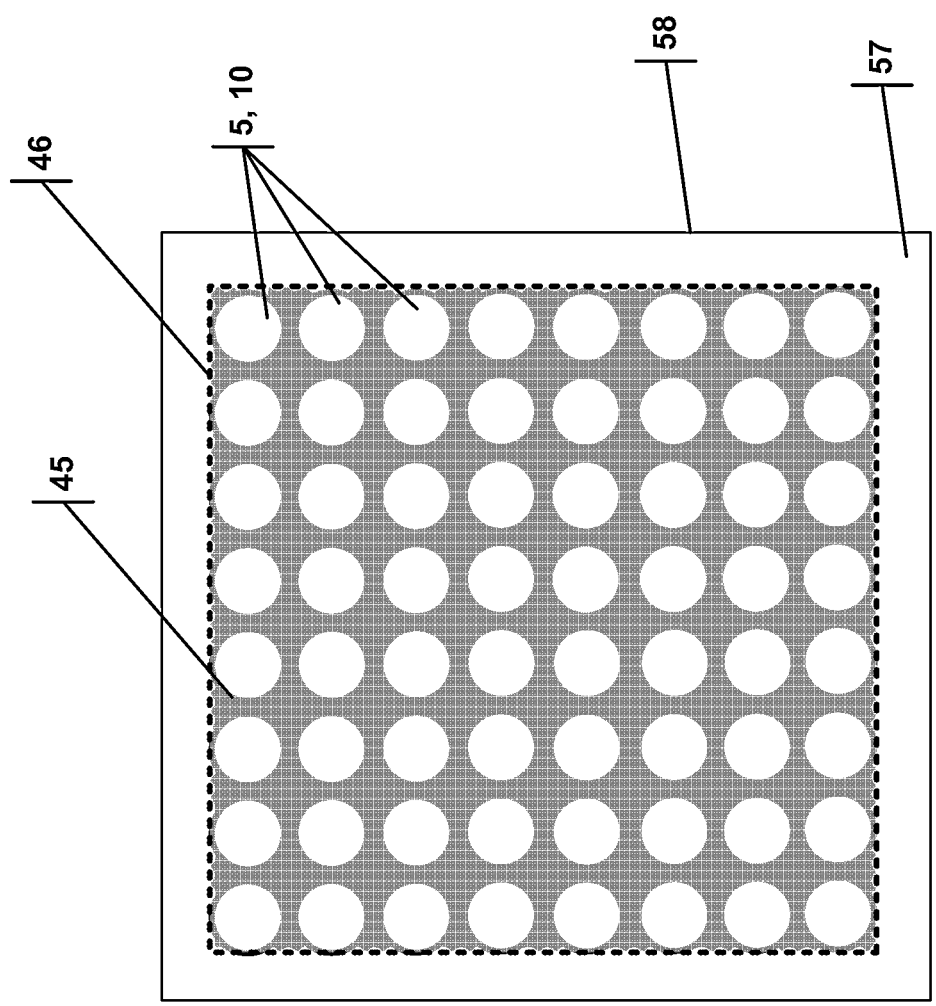
FIG. 7 is a top view of the TRNG of FIG. 6 illustrating the cell array matrix surface circumscribed by the radioactive source (with extension) surface.

In Eq. 4, c is the width of an extension region of a source material discussed below and shown in FIGS. 6 and 7. Well-known formulas govern inverse tangent functions and their integrals:

$$\tan^{-1}(-x) = -\tan^{-1}(x) \quad (5)$$

$$\int \tan^{-1}(1/x)dx = \frac{1}{2} \cdot \log(x^2 + 1) + x \cdot \tan^{-1}(1/x) \quad (6)$$

$$\lim_{x \to 0}\left\{x \cdot \tan^{-1}\left(\frac{1}{x}\right)\right\} = 0 \quad (7)$$

Figure 3:
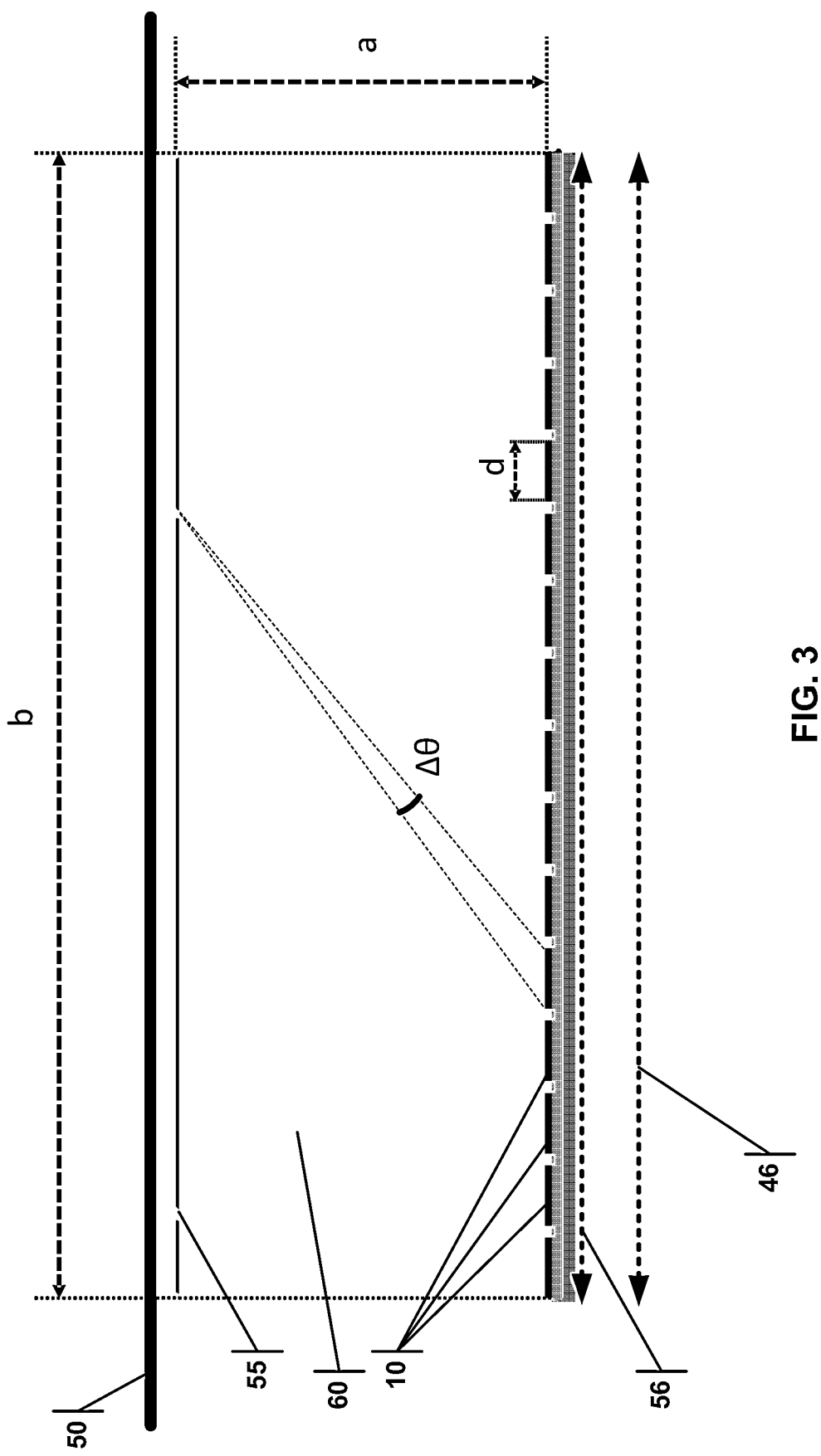
FIG. 3 illustrates a cross-section of a TRNG with a radioactive source and a matrix of detectors.
Figure 5:
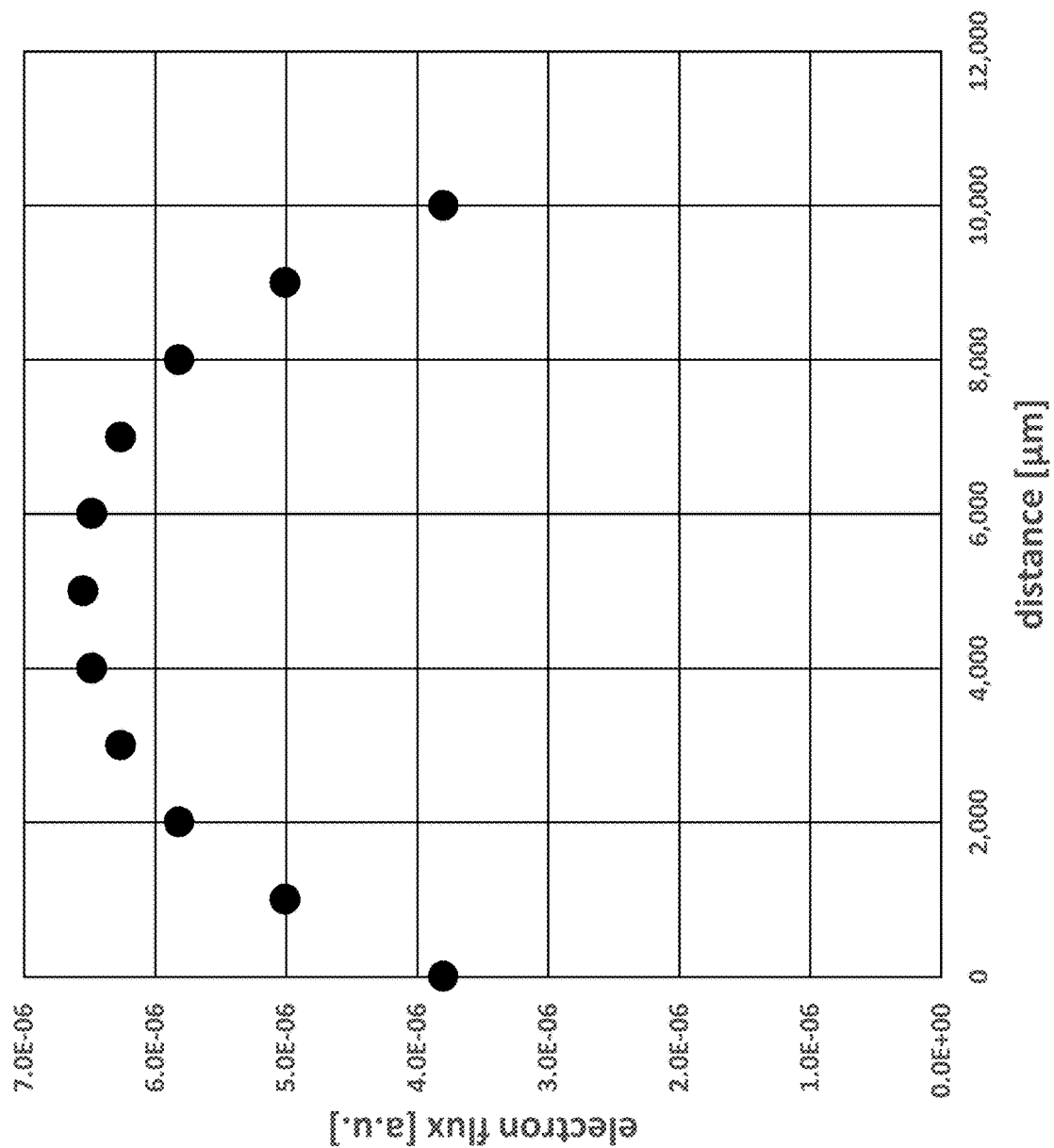
FIG. 5 is a graph of the electron flux v. distance from the edge of the TRNG chip for the TRNG of FIG. 3.

Numerically solving the problem results in the graph shown in FIG. 5. This graph shows the large impact of finite radiation source on flux observed on the edge detectors as compared with those in the middle of an array. Note this is when c is set to zero, as shown in FIG. 3.

Two ways of making the electron flux (or counts at each detector per time unit) more uniform across the array are proposed here. The first solution is to extend the radiation source beyond the area of detectors, thus reducing the influence of the edge effect. Typically, the IC enclosure allows for a slightly larger radiation source than the area of the IC. In our computational example, it is possible to add more radiation source with a width of c=1,500 μm on each side of the square array. Distances for such a situation are presented in FIG. 6. FIG. 7 illustrates the TRNG detector chip with cell array matrix 45 of cells/detectors (5, 10), that has a cell array matrix surface 46. By the addition of the radioactive source extension 57, the radiation source surface 58 is larger than and encompasses the cell array matrix surface 46. This is also shown in FIG. 6 where the radioactive source surface projection 59 extends beyond the edge of the cell array matrix surface 46 (compare to radioactive source surface projection 56 and the cell array matrix surface 46 in FIG. 3). A projection is the transformation of points and lines in one plane/surface onto another plane/surface by connecting corresponding points on the two planes with parallel lines. Here, the radioactive source surface projection 59 is the projection of the radioactive source surface 58 onto the cell array matrix surface 46.

Figure 8:
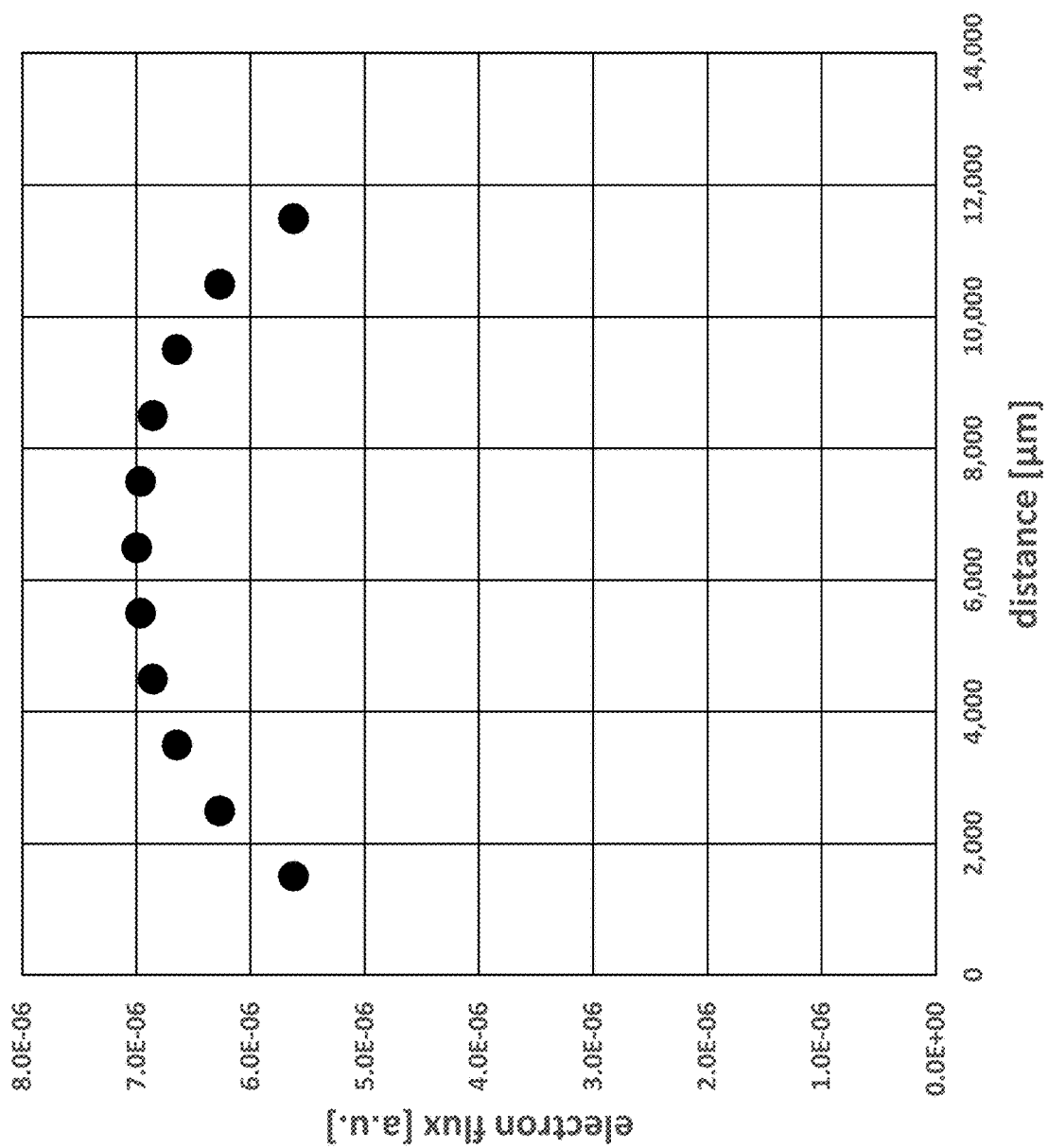
FIG. 8 is a graph of the electron flux v. distance from the edge of the TRNG chip for the TRNG of FIG. 6.

Plotting the detector radiation exposure as was done in FIG. 5, but now with c=1,500 μm, demonstrates that the radioactive source extension 57 does indeed improve the uniformity, see FIG. 8, but still, the detectors in the middle of an array obtain much larger doses than those on the edge. The difference of electrons detected by the detectors in this example varies across the cell array matrix surface 46 by about 20% from the edges to the center point. Without the radioactive source extension 57 (see FIG. 5) the difference across the cell array matrix surface 46 is greater than 42%. Thus, the distance the radioactive source extension 57 extends past the edge of the cell array matrix surface 46 can be selected to achieve an electron flux from the radioactive source that varies less than 40% over the cell array matrix surface 46, preferable less than 25%, more preferably less than 20% and most preferably less than 15%.

The second proposed solution, which may be used in conjunction with the first or in lieu of the first, is to increase the area of detectors that are closer to the edge, thus increasing the number of electrons that impinge upon them per unit time. Calculation of the area increase is done by using the ratio of fluxes that hit the center and edge detectors. The calculations on how larger outer detectors need to be enlarged are presented in Table 1:

TABLE 1

| position $x_0$ [μm] | 1,505.5 | 2,500.0 | 3,500.0 | 4,500.0 | 5,500.0 | 6,500.0 | 7,500.0 | 8,500.0 | 9,500.0 | 10,500.0 | 11,494.5 |
|---|---|---|---|---|---|---|---|---|---|---|---|
| detector size [μm] | 13.7 | 12.3 | 11.6 | 11.2 | 11.1 | 11.0 | 11.1 | 11.2 | 11.6 | 12.3 | 13.7 |

In other words, most outer detectors in this particular case need to be enlarged (linearly) by about 2.7 µm or by about 25%. The final design based on a two-dimensional array of detectors will require additional enlargement of the corner detectors by the square of the ratio calculated above, i.e., by about 55% (area enlargement; corner detector will have a diameter of 17.1 µm as compared with the diameter at the center equal 11 µm as described above). All detectors in between the center and edges/corners will have their sizes increased proportionately, as per calculations presented above. A method to determine the various sizes of the detectors would include (a) determining the flux across the proposed array matrix surface; (b) calculating the difference between the maximum flux and the minimum flux across the proposed array matrix surface; (c) increasing the area of the detectors of the array matrix as a function of the distance of the detector from the point of maximum flux and the difference in step (c).

Figure 9:
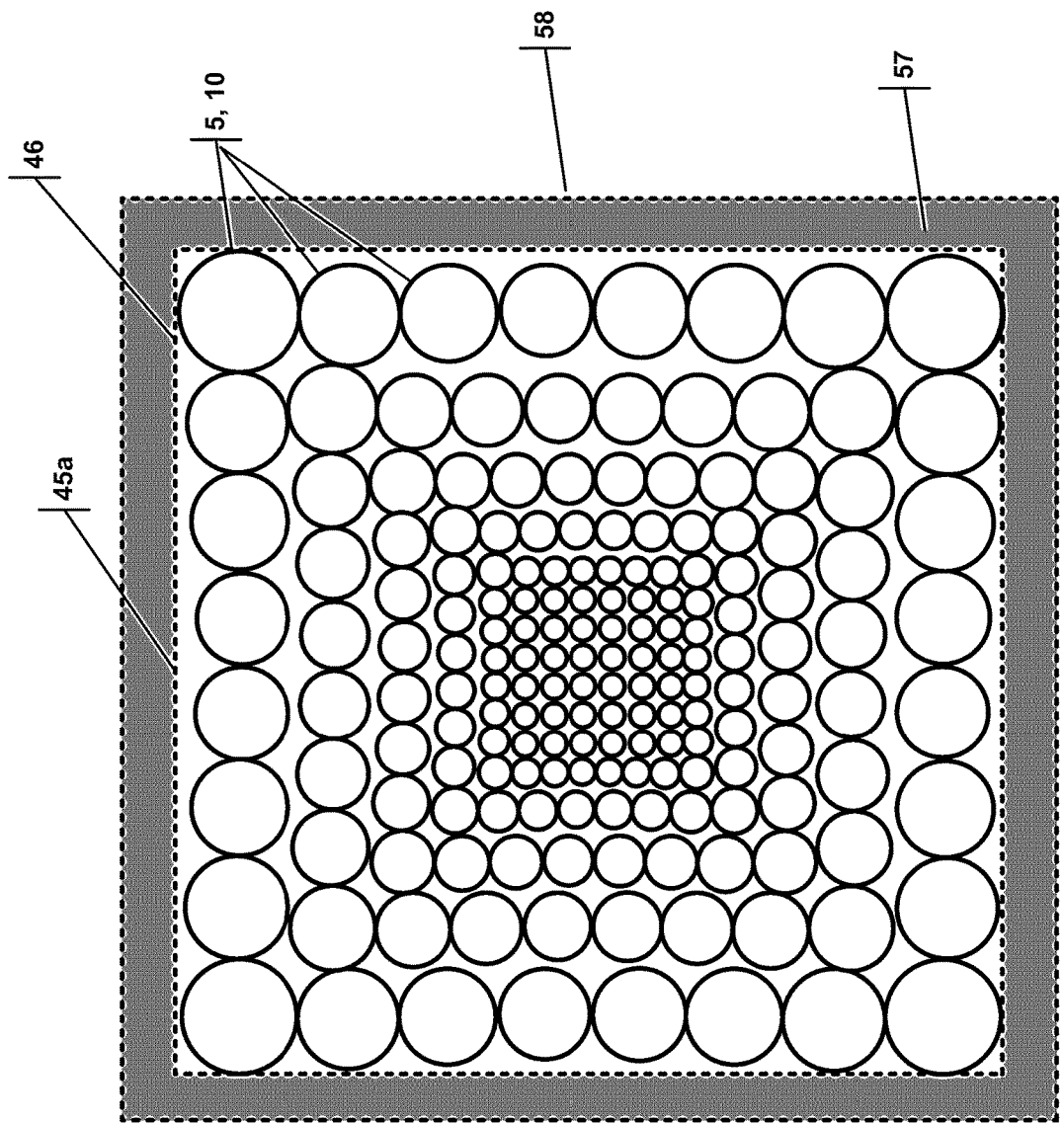
FIG. 9 is a top view of a TRNG with a cell array matrix surface circumscribed by the radioactive source (with extension) surface, and cell/detectors of varying size.

Generally, the radioactive source is centered above the array matrix such that the center point of the array matrix surface will correspondence to the maximum flux, with the flux diminishing as a function of distance away from the center point. A TRNG detector chip with cell array matrix 45a of cells/detectors (5, 10) that vary in size according to this method is shown in FIG. 9. The cells/detectors (5, 10) are the largest in the corners, and the size of the cells increases the farther away the detector is from the center point of the array matrix 45a. The TRNG detector chip shown in FIG. 9 also has the radioactive source extension 57 and a radiation source surface 58 is larger than and encompasses the cell array matrix surface 46.

Figure 10:
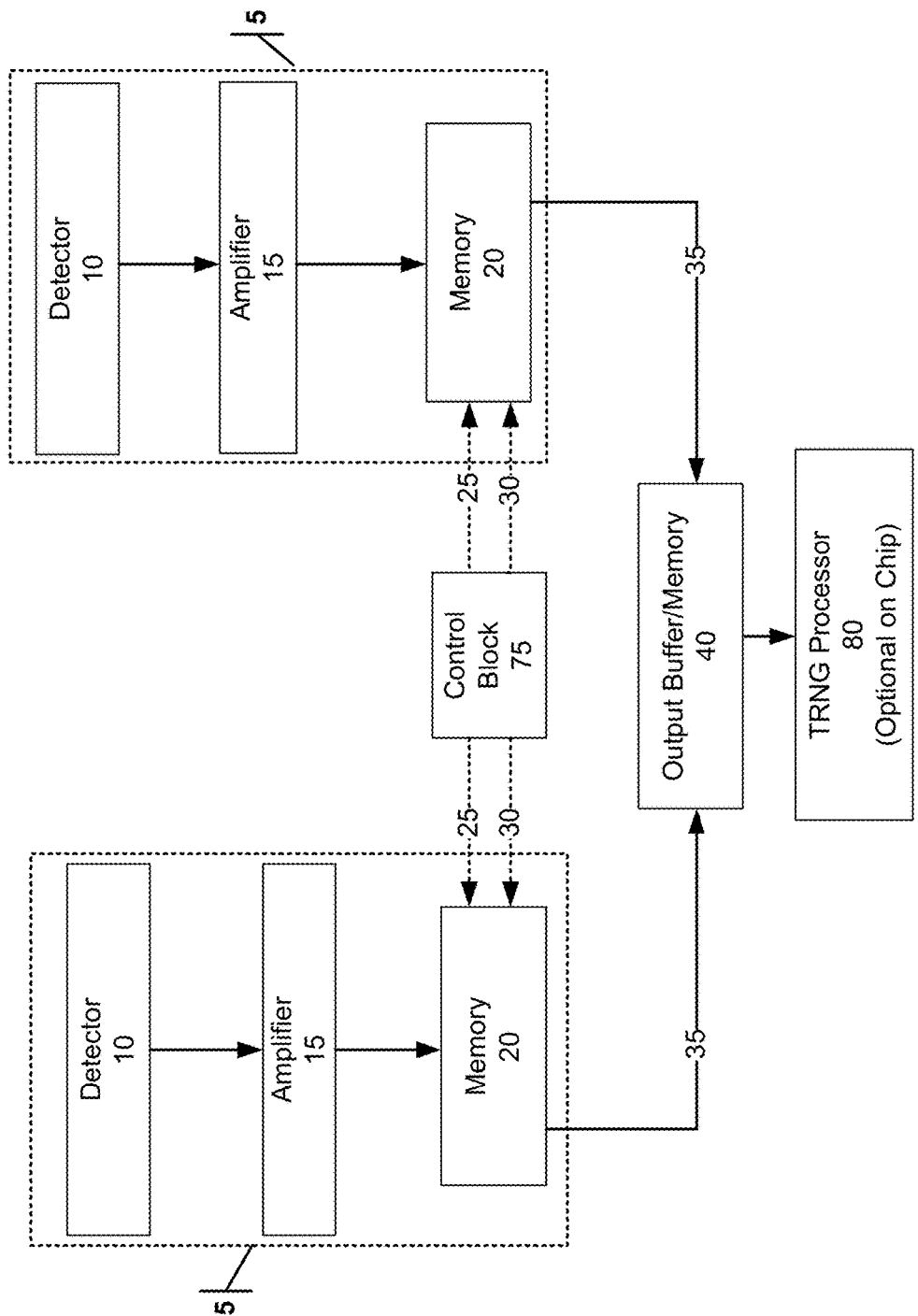
FIG. 10 is a flow diagram of the various components that may be placed on the integrated circuit.

FIG. 10 is a flow diagram of the various components that may be placed on the integrated circuit, using cell 5. The cells include a silicon substrate 8 with a detector 10 constructed to detect electrons within the cavity from the decay of the radioactive nickel and to produce a signal for the detected electrons. The amplifier 15 connected to the detector amplifies the signal and passes it to memory 20 for storage. A control block 75 is connected to each cell 5 in the linear array. The contents of the memory 20 can be passed to the output buffer 40, from which a true random number may be generated by the TRNG processor 80.

Various example embodiments of the present apparatus, systems, and methods demonstrate that ICs can be impregnated with radioactive material during manufacturing. Even with a very small amount of radioactive nickel each such chip can generate a significant number of random bits per second, see Table 1 above: $6.4 \cdot 10^8$ bits/(s·cm2). Then these bits can be stored for later use in a solid-state memory incorporated inside IC. Thus, such standalone TRNG on-chip can easily provide on-demand thousands of multi-byte random numbers needed for encryption of communication channels (like voice or text messages) or for processes requiring plenty of random numbers (like simulations or gaming).

Any of the suitable technologies, materials, and designs set forth and incorporated herein may be used to implement various example aspects of the invention as would be apparent to one of skill in the art.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system, or method falls within the scope of one of the claims that are allowed by the patent office based on this or any related patent application.

The invention claimed is:

1. An enclosure for use in a true random number generator (TRNG), the enclosure comprising:
   a radioactive source defining a radioactive source surface;
   a cavity separating the radioactive source from an array of cells defining an array surface with an edge;
   wherein each cell in the array comprises a detector constructed to detect electrons within the cavity from the decay of the radioactive source and to produce a signal for the detected energy;
   wherein the TRNG produces a true random number based on the signals produced from the detectors; and
   wherein a projection of the radioactive source surface onto the array surface extends beyond the edge and encompasses the array surface.

2. The enclosure of claim 1, wherein the radioactive source is nickel.

3. The enclosure of claim 1, wherein the array surface has a central point, and wherein the size of the detector in each cell is based on the distance of the detector from the central point.

4. The enclosure of claim 1, further comprising a memory connected to each detector in the array of cells, wherein the memory stores the signals produced from the detector.

5. The enclosure of claim 4, further comprising a TRNG processor constructed to produce the true random number based on the contents of the memory.

6. The enclosure of claim 1, wherein the projection of the radioactive source surface onto the array surface extends beyond the edge by a distance, and wherein the distance is selected to maintain an electron flux from the radioactive source that varies less than 30% across the array surface.

7. The enclosure of claim 1, wherein the projection of the radioactive source surface onto the array surface extends beyond the edge by a distance, and wherein the distance is selected to maintain an electron flux from the radioactive source that varies less than 25% across the array surface.

8. The enclosure of claim 1, wherein the projection of the radioactive source surface onto the array surface extends beyond the edge by a distance, and wherein the distance is selected to maintain an electron flux from the radioactive source that varies less than 20% across the array surface.

9. An enclosure for use in a true random number generator (TRNG), the enclosure comprising:
   a radioactive source;
   a cavity separating the radioactive source from an array of cells defining an array surface with a central point,
   wherein each cell in the array comprises a detector constructed to detect electrons within the cavity from the decay of the radioactive source and to produce a signal for the detected energy;
   wherein the TRNG produces a true random number based on the signals produced from the detectors; and
   wherein the size of the detector in each cell is based on the distance of the detector from the central point.

10. The enclosure of claim 9, wherein the radioactive source is nickel.

11. The enclosure of claim 9, wherein the radioactive source defines a radioactive source surface, and the array surface comprises an edge; and wherein a projection of the radioactive source surface onto the array surface extends beyond edge and encompasses the array surface.

12. The enclosure of claim 9, further comprising a memory connected to each detector in the array of cells, wherein the memory stores the signals produced from the detector.

13. The enclosure of claim 12, further comprising a TRNG processor constructed to produce the true random number based on the contents of the memory.

* * * * *